(12) United States Patent
Fujii

(10) Patent No.: US 9,378,006 B2
(45) Date of Patent: Jun. 28, 2016

(54) APPARATUS HAVING CHECK UNIT TO CHECK PROGRESS STATUS OF SOFTWARE INSTALLATION OF APPARATUS IDENTIFIED BY IDENTIFICATION INFORMATION STORED IN EXTERNAL STORAGE, CONTROL METHOD FOR APPARATUS, AND STORAGE MEDIUM

(71) Applicant: CANON KABUSHIKI KAISHA, Tokyo (JP)

(72) Inventor: Manabu Fujii, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 180 days.

(21) Appl. No.: 14/163,990

(22) Filed: Jan. 24, 2014

(65) Prior Publication Data
US 2014/0215454 A1 Jul. 31, 2014

(30) Foreign Application Priority Data
Jan. 28, 2013 (JP) ................. 2013-013323

(51) Int. Cl.
*G06F 9/44* (2006.01)
*G06F 9/445* (2006.01)
(Continued)

(52) U.S. Cl.
CPC ............... *G06F 8/61* (2013.01); *G06F 9/4411* (2013.01); *G06F 11/1433* (2013.01); *G06F 8/65* (2013.01); *G06F 11/3612* (2013.01)

(58) Field of Classification Search
CPC ............ G06F 17/30893; G06F 3/1294; G06F 3/1207; G06F 3/1259; G06F 9/4443; G06F 8/61; G06F 8/65; G06F 8/665; G06F 11/325; G06F 11/1433; G06F 21/55; G06F 11/3612; G06F 9/4411
See application file for complete search history.

(56) References Cited

U.S. PATENT DOCUMENTS

| | | | |
|---|---|---|---|
| 6,618,771 B1 * | 9/2003 | Leja | G06F 9/4411 710/10 |
| 6,681,392 B1 * | 1/2004 | Henry | G06F 9/4411 358/305 |

(Continued)

FOREIGN PATENT DOCUMENTS

JP    2012-190239 A    10/2012

OTHER PUBLICATIONS

Cesar Quiroga et al., Utility Installation Review System Implementation Report, Mar. 2009, [Retrieved on Mar. 8, 2016]. Retrieved from the internet: <URL: http://ntl.bts.gov/lib/31000/31200/31267/5-2110-03-2.pdf> 84 Pages (1-71).*

(Continued)

*Primary Examiner* — Thuy Dao
*Assistant Examiner* — Anibal Rivera
(74) *Attorney, Agent, or Firm* — Canon USA, Inc. IP Division

(57) ABSTRACT

An apparatus to which an external storage device is connectable includes a setting unit configured to, after the external storage device is connected, perform software installation of the apparatus based on setting data acquired from the external storage device, a storage control unit configured to store, in the external storage device, progress information necessary for displaying a screen used for checking a progress status of the software installation and identification information of the apparatus, and a display unit configured to display the progress status of the software installation of the apparatus identified by the identification information stored in the external storage device, based on the progress information.

13 Claims, 21 Drawing Sheets

(51) Int. Cl.
  *G06F 15/173* (2006.01)
  *G06F 11/14* (2006.01)
  *G06F 11/36* (2006.01)

(56) References Cited

U.S. PATENT DOCUMENTS

| | | | | |
|---|---|---|---|---|
| 7,355,758 B2* | 4/2008 | Desai | ................ | H04N 1/00209 345/1.1 |
| 8,243,306 B2* | 8/2012 | Inoue | ................ | G06F 8/61 358/1.15 |
| 2002/0010806 A1* | 1/2002 | Yamade | ................ | G06F 9/4411 719/327 |
| 2003/0103235 A1* | 6/2003 | Gomi | ................ | G06F 3/1229 358/1.15 |
| 2004/0148379 A1* | 7/2004 | Ogura | ................ | H04L 29/06 709/223 |
| 2005/0036348 A1* | 2/2005 | Aoyama | ................ | G06F 11/1433 365/201 |
| 2008/0244556 A1* | 10/2008 | Plante | ................ | G06F 8/65 717/170 |
| 2011/0066960 A1* | 3/2011 | Suzuki | ................ | G06F 8/65 715/764 |
| 2011/0231701 A1* | 9/2011 | Aoki | ................ | G03G 15/5079 714/15 |
| 2013/0014100 A1* | 1/2013 | Akiyama | ................ | G06F 11/3612 717/176 |
| 2014/0040877 A1* | 2/2014 | Goldman | ................ | G06F 8/61 717/174 |

OTHER PUBLICATIONS

Neil Clymer et al., A new approach for understanding dominant desig: The case of the ink-jet printer, 2008, [Retrieved on Mar. 8, 2016]. Retrieved from the internet: <URL: http://ac.els-cdn.com/S0923474808000234/1-s2.0-S0923474808000234-main.pdf> 20 Pages (137-156).*

* cited by examiner

| 401 | | |
|---|---|---|
| FIRMWARE | Xxx.firm | 402 |
| APPLICATION AND LICENSE | Aaa.jar, 201210191234.license | 403 |
| | bbb.jar, 201211011902.license | |
| | ccc.jar, 201209170922.license | |
| DEVICE SETTING VALUE | Yyy.config | 404 |
| APPLICATION SETTING VALUE | Aaa.zip | 405 |
| | Bbb.zip | |

FIG.5A

| APPARATUS IDENTIFICATION NUMBER | FIRMWARE | APPLICATION | DEVICE SETTING VALUE | APPLICATION SETTING VALUE | START TIME |
|---|---|---|---|---|---|
| 0000001 | 13:25:40 | 13:26:45 | 13:36:49 | 13:41:46 | 13:15:46 |
| 0000002 | 13:28:14 | 13:29:14 | 13:38:44 | 13:43:14 | 13:18:14 |
| ...... | ...... | ...... | ...... | ...... | ...... |

FIG.5B

| APPARATUS IDENTIFICATION NUMBER | FIRMWARE | APPLICATION | DEVICE SETTING VALUE | APPLICATION SETTING VALUE | START TIME |
|---|---|---|---|---|---|
| 0000001 | 15 min | 30 sec | 10 min | 5 min | 13:15:46 |
| 0000002 | 16 min | 20 sec | 10 min | 5 min | 13:18:14 |
| ...... | ...... | ...... | ...... | ...... | ...... |

| | BEFORE SETTING | AFTER SETTING | REQUIRED TIME |
|---|---|---|---|
| FIRMWARE | Xxx.firm | Yyy.firm | 10 min |
| APPLICATION | | aaa | 30 sec |
| | | bbb | 20 sec |
| DEVICE SETTING VALUE s | OFF | ON | 10 min |
| DEVICE SETTING VALUE t | α | β | |
| DEVICE SETTING VALUE u | ON | OFF | |
| ...... | ...... | ...... | ...... |
| ...... | ...... | ...... | ...... |

| APPARATUS IDENTIFICATION NUMBER | IP ADDRESS |
|---|---|
| 0000001 | 172.24.a.b |
| 0000002 | 172.24.x.y |
| ...... | ...... |
| ...... | ...... |

| APPARATUS IDENTIFICATION NUMBER | FIRMWARE | APPLICATION | SETTING | START TIME | NETWORK SETTING | IP ADDRESS |
|---|---|---|---|---|---|---|
| 0000001 | 600 sec | 75 sec | 604 sec | 13:15:46 | 10 sec | 172.24.a.b |
| 0000002 | 600 sec | 60 sec | 570 sec | 13:18:14 | 10 sec | 172.24.x.y |
| ...... | ...... | ...... | ...... | ...... | ...... | ...... |
| ...... | ...... | ...... | ...... | ...... | ...... | ...... |

1901

APPARATUS HAVING CHECK UNIT TO CHECK PROGRESS STATUS OF SOFTWARE INSTALLATION OF APPARATUS IDENTIFIED BY IDENTIFICATION INFORMATION STORED IN EXTERNAL STORAGE, CONTROL METHOD FOR APPARATUS, AND STORAGE MEDIUM

BACKGROUND OF THE INVENTION

1. Field of the Invention

The present invention relates to an apparatus which allows software installation, a control method for the apparatus, and a storage medium.

2. Description of the Related Art

Along with the trend toward image forming apparatuses with multiple functions, setting of such image forming apparatuses when they are installed has become complicated. Accordingly, the operation time and the labor cost of the service engineer who performs the setting of the image forming apparatuses are increasing.

As a conventional technique for solving such a problem, there is a method by which firmware and setting data necessary for the operation are delivered to the image forming apparatus via a network so that software can be installed on the image forming apparatus. Further, there is also known a method which uses a removable external storage device such as a universal serial bus (USB) flash memory in place of the network. According to this method, the firmware and the setting data are stored in the removable external storage device in advance. Then, when the external storage device is connected to the image forming apparatus, the firmware and the setting data are transferred to the image forming apparatus and the software installation can be performed.

According to the methods described above, once the external storage device is connected to the image forming apparatus, the software can be freely installed on the image forming apparatus. However, although the installation can be easily performed, a method for managing the result of the installation after the installation of the software has not been established. Thus, as for a service engineer managing a plurality of image forming apparatuses, it is difficult to manage information regarding which apparatus has been updated and which apparatus needs to be updated.

In order to solve such a problem, Japanese Patent Application Laid-Open No. 2012-190239 discusses a method by which after software is installed via an external storage device, information regarding whether update has been performed is stored in the external storage device. Accordingly, the service engineer can manage the result of the setting operation.

If the service engineer sequentially installs software on a plurality of image forming apparatuses in a parallel manner by using an external storage device, it is convenient if the service engineer can check the progress status of the software installation of each image forming apparatus since the service engineer can efficiently collect the result information. However, a concrete method for checking the progress status of the software installation of the image forming apparatus is not discussed in Japanese Patent Application Laid-Open No. 2012-190239.

SUMMARY OF THE INVENTION

The present invention is directed to a method for checking a progress status of software installation of an image forming apparatus.

According to an aspect of the present invention, an apparatus to which an external storage device is connectable includes a setting unit configured to, after the external storage device is connected, perform software installation of the apparatus based on setting data acquired from the external storage device, a storage control unit configured to store, in the external storage device, progress information necessary for displaying a screen used for checking a progress status of the software installation and identification information of the apparatus, and a display unit configured to display the progress status of the software installation of the apparatus identified by the identification information stored in the external storage device based on the progress information.

Further features of the present invention will become apparent from the following description of exemplary embodiments with reference to the attached drawings.

BRIEF DESCRIPTION OF THE DRAWINGS

FIGS. 5A and 5B illustrate estimated time tables according to the first exemplary embodiment.

FIG. 7 illustrates a setting result file according to the first exemplary embodiment.

FIG. 13 illustrates an example of a screen when the setting operation is completed according to the first exemplary embodiment.

FIG. 17 illustrates an estimated time table according to the second exemplary embodiment.

FIG. 19 illustrates an estimated time table according to the third exemplary embodiment.

DESCRIPTION OF THE EMBODIMENTS

Figure 1:
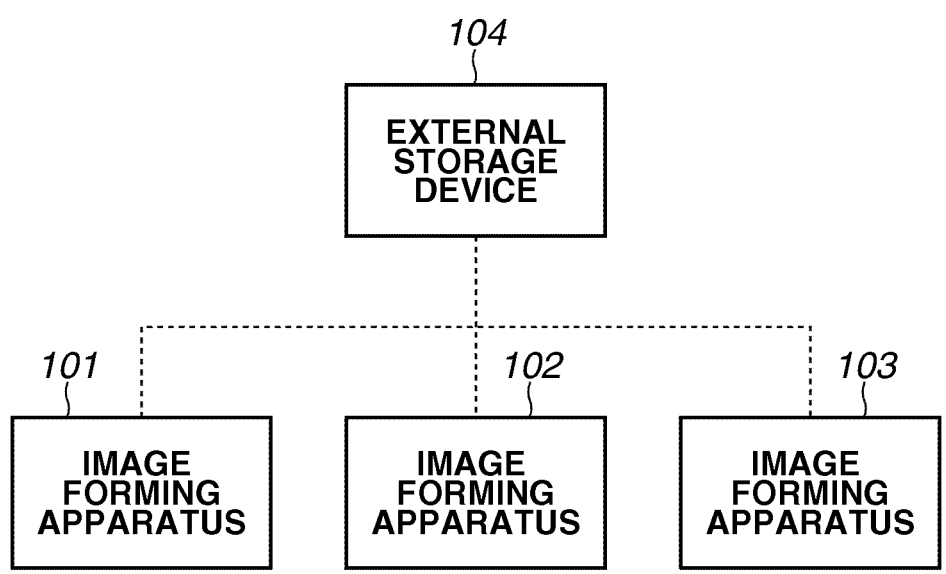
FIG. 1 illustrates a configuration of a system according to a first exemplary embodiment of the present invention.

Various exemplary embodiments, features, and aspects of the invention will be described in detail below with reference to the drawings.

First, the terms used in the exemplary embodiments of the present invention will be described.

A term "Service engineer" is used for an operator who has a technical knowledge of image forming apparatuses. In addition to physically installing an image forming apparatus at the customer's site, the service engineer performs maintenance operations of the image forming apparatus in place of the customer. An administrator on the customer's side may also perform such operations.

A term "apparatus setting value" is used for a value which is set for the image forming apparatus. It is a parameter of software which controls the operation of each unit of the image forming apparatus. A term "application setting value" is also used for a value which is set for the image forming apparatus. It is a parameter used for controlling an application installed on the image forming apparatus. If a term "setting value" is used in the following description, it is either the "apparatus setting value" or the "application setting value" or both of them.

A term "import" is used for the image forming apparatus which externally obtains a setting value via a removable memory or the like and updates the setting value stored in the image forming apparatus with the obtained setting value. A term "setting data" is used for data which is necessary for the operation of the image forming apparatus. The setting data can be, for example, firmware, an application, a license file, an application setting value, or an apparatus setting value. In other words, the setting data includes a software program and a setting value set to the software program. Only software may be called the setting data. Further, only a setting value of software may be called the setting data.

A term "software installation" is the processing performed by the service engineer when the engineer installs the software necessary for the operation of the image forming apparatus and sets the setting value to be set for the installed software as the setting value of the software. Only the installation of software may be called the software installation. Further, only the setting of the software setting value necessary for the installed software as the setting value of the software may be called the software installation.

A term "setting operation" is used for the software installation operation of the image forming apparatus. The software installation includes a plurality of processes. As typical processes of the software installation, there are a firmware updating process, a setting process of an apparatus setting value after the firmware is updated, an application installation process, and a setting process of an application setting value after the application is installed. The above-described terms are the main terms used in the present invention. Terms other than those described above will be described as appropriate.

If a service engineer is to perform the software installation operation of a plurality of image forming apparatuses in a parallel manner using an external storage device, it is convenient for the service engineer to be able to keep track of the progress status of the software installation of each image forming apparatus. This is because if the service engineer installs software on a plurality of image forming apparatuses in a parallel manner using an external storage device without being able to keep track of the progress status, it may cause inconvenience when the software is automatically installed on each image forming apparatus.

The service engineer who is unable to check the progress status of the software installation of each image forming apparatus needs to go to the site of the image forming apparatus which has undergone the software installation operation at arbitrary timing, connect the external storage device to the image forming apparatus, and collect the result of the software installation. If the software installation is not yet finished when the service engineer connects the external storage device to the image forming apparatus in order to collect the result of the installation, the service engineer needs to wait until the installation is finished. Thus, the installation of the image forming apparatus cannot be efficiently performed.

A method for checking the progress status of the software installation of an image forming apparatus will be described in detail according to a first exemplary embodiment.

First, a configuration of a system according to the first exemplary embodiment will be described with reference to FIG. 1. Each of image forming apparatuses 101, 102, and 103 is a digital multifunction image forming apparatus equipped with a print function, a copy function, a facsimile function, and a transmission function (e-mail, FTP) or an image forming apparatus such as a printer, a scanner, or a facsimile machine. The image forming apparatus 101 includes an interface which is used for connection with an external storage device 104. When the external storage device 104 is connected to the interface, data can be read from and stored in the external storage device 104.

The external storage device 104 is a transportable storage medium which is connectable to and removed from the image forming apparatus 101. It is, for example, a USB flash memory. The external storage device 104 stores firmware, an application, and setting value information associated with the image forming apparatuses 101, 102, and 103. Further, the external storage device 104 stores an estimated time table 501, a setting data management file 401, and a setting result file 701. Although three apparatuses (the image forming apparatuses 101, 102, and 103) are illustrated in FIG. 1, the number of image forming apparatuses according to the present invention is not limited.

Figure 2:
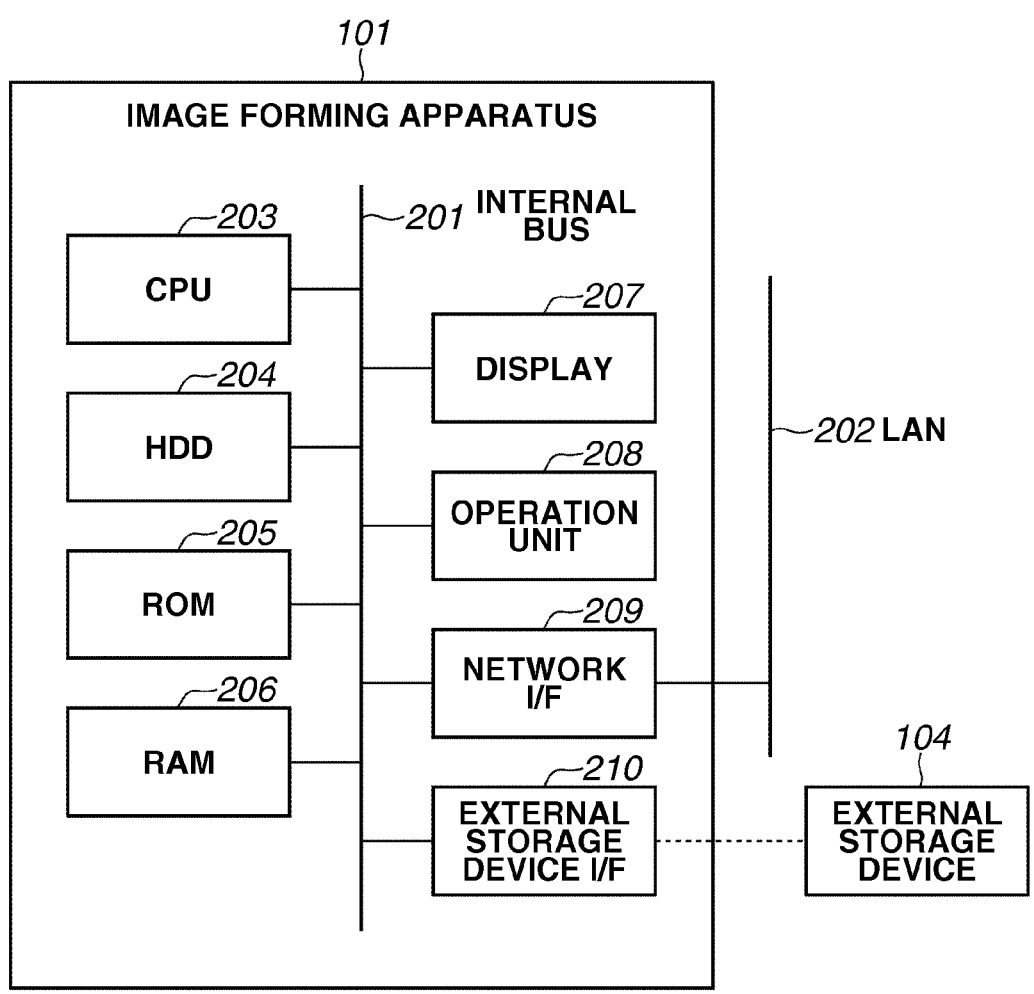
FIG. 2 illustrates a hardware configuration of an image forming apparatus according to the first exemplary embodiment.

FIG. 2 illustrates a hardware configuration of the image forming apparatus 101. Since the hardware configurations of the image forming apparatuses 102 and 103 are similar to those of the image forming apparatus 101, their description is not repeated. An internal bus 201 is connected to each unit of the hardware.

A local area network (LAN) 202 is a network to which the image forming apparatus 101 is connected. The image forming apparatus 101 can be connected to the image forming apparatuses 102 and 103 as well as the Internet (not illustrated) via the LAN 202. A central processing unit (CPU) 203 executes software stored in a read-only memory (ROM) 205. A hard disk drive (HDD) 204 is a non-volatile storage area and stores setting values, operation logs, etc. Further, the HDD 204 stores an estimation reference file 601. When the software runs on the image forming apparatus, the operation of the software is recorded in the operation log. Further, an error status is also recorded in the operation log.

The ROM 205 stores at least the software of the image forming apparatus 101 and a setting value of the software. A random access memory (RAM) 206 is a work memory area used for the execution of the software. The RAM 206 is used as a temporary storage area. A display 207 displays the user operation and the error information according to the state of the image forming apparatus as well as the progress status of the software installation. The display 207 is also a panel which displays a screen via which the user issues copy and scan instructions.

An operation unit 208 includes key input units which are controlled by the CPU 203. The operator issues various setting instructions associated with scanner reading and print output as well as start/stop instructions via the key input. A network I/F 209 is an interface unit by which the image forming apparatus 101 is connected to the LAN 202. Via the LAN 202, the image forming apparatus 101 communicates with other image forming apparatuses as well as apparatuses on the Internet (not illustrated). An external storage device I/F 210 is an interface by which the image forming apparatus 101 is connected to the external storage device 104. The external storage device I/F 210 is, for example, a USB interface.

Figure 3:
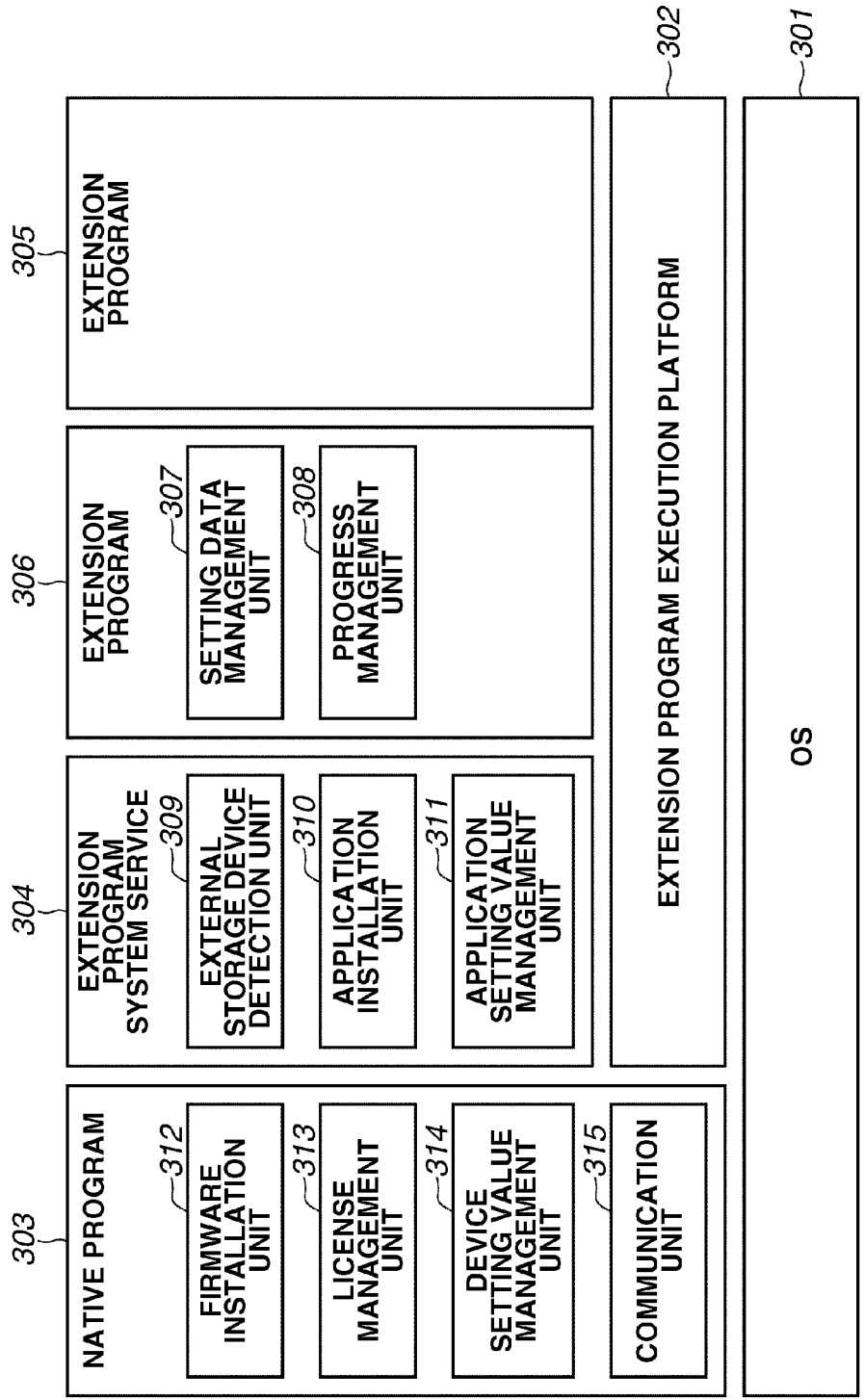
FIG. 3 illustrates a software configuration of the image forming apparatus according to the first exemplary embodiment.

FIG. 3 illustrates a software configuration of the image forming apparatus 101. In FIG. 3, each configuration unit in a box indicates a software unit. The software units of the image forming apparatus 101 are stored in the ROM 205 and executed by the CPU 203. Further, various types of information which are used when the software is executed are stored in the RAM 206 or the HDD 204 and exchanged between the software units. Communication with an external device is performed via the network I/F 209. Especially, if software is to be added or updated, or if a setting value is to be changed, various types of data stored in the external storage device 104 are stored in the HDD 204 via the external storage device I/F 210 and used for the corresponding processing.

Next, the software configuration of the image forming apparatus 101 will be described. An operating system (OS) 301 is system software which provides basic functions (e.g., input/output function and disk and memory management) commonly used by various types of application software. The OS 301 manages the entire system.

An extension program execution platform 302 is an execution environment of an extension program 305 and runs on the OS 301. According to the introduction of the extension program execution platform 302, the extension program 305 and an extension program 306 can operate without depending on the OS. A native program 303 is software which is installed in the printer, the fax machine or the scanner in advance.

An extension program system service 304 is a program which runs on the extension program execution platform 302. The extension program system service 304, which is supplied from the image forming apparatus, is a utility library which is useful for the extension programs in common. Since the extension programs 305 and 306 can invoke the extension program system service 304, the time and effort necessary for developing extension programs can be reduced.

The extension program 305 is software which runs on the extension program execution platform 302. The extension program 305 can access each module of the image forming apparatus 101 such as another extension program or the RAM 206 only via the extension program execution platform 302 or the extension program system service 304. Typical software of the extension program 305 is software used for printing and scanning.

The extension program 306 is software that enables the installation of the extension program 305. The extension program 306 includes a setting data management unit 307 and a progress management unit 308 described below. The extension program 306 works with the extension program system service 304 and the native program 303 via the setting data management unit 307 and the progress management unit 308 when it installs other extension programs. In the following description, if an extension program is simply called an "application", it indicates the extension program 305 installed by the extension program 306.

The setting data management unit 307 manages the setting data of the image forming apparatus 101. On receiving a notification from an external storage device detection unit 309, the setting data management unit 307 obtains the setting data stored in the external storage device 104. When the setting data management unit 307 obtains the setting data, the setting data management unit 307 references the setting data management file 401 in the external storage device 104. Then, the setting data management unit 307 sends the obtained setting data to a firmware installation unit 312, an application installation unit 310, a license management unit 313, an application setting value management unit 311, or an apparatus setting value management unit 314 according to the type of the setting data.

Figure 4:
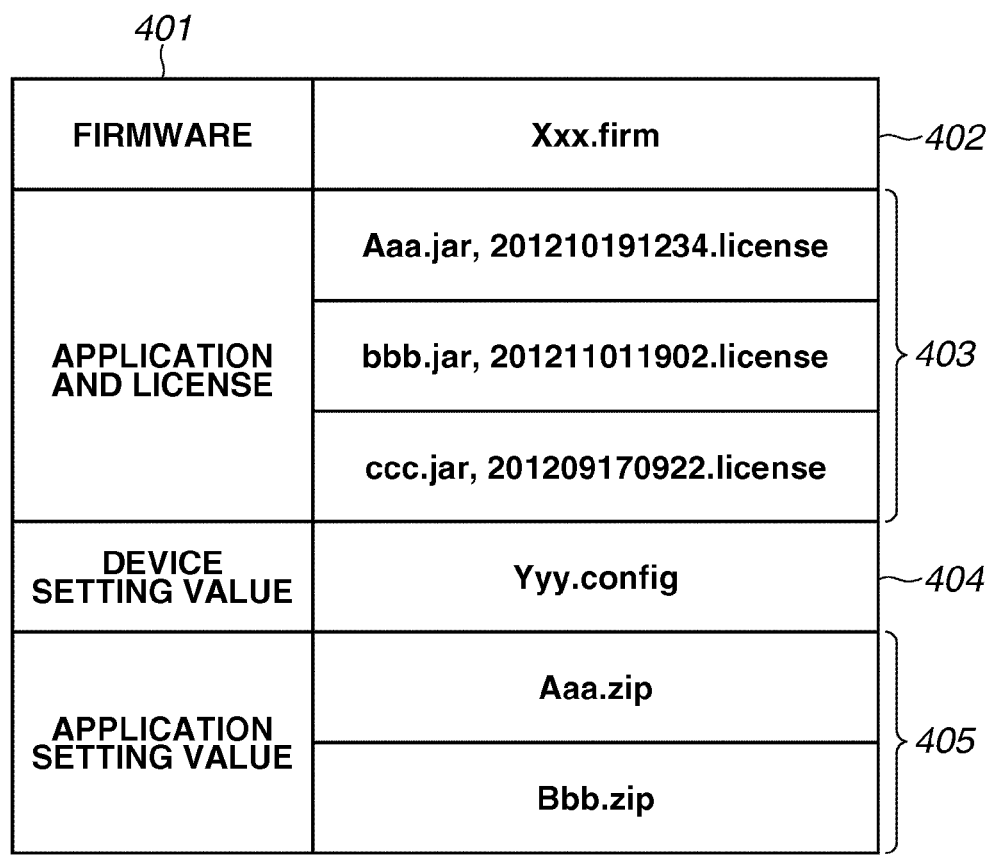
FIG. 4 illustrates a setting data management file according to the first exemplary embodiment.

FIG. 4 illustrates a configuration of the setting data management file 401. The setting data management file 401 includes data of the firmware and the application to be installed on the image forming apparatus. The setting data management file 401 further includes the apparatus setting value and the application setting value to be set to the image forming apparatus. One setting data management file 401 is prepared for each image forming apparatus. The setting data management file does not necessary include the four types of setting data described above. For example, the setting data management file may include only the firmware or only the application setting value.

An item 402 shows a file name of the firmware to be installed on the image forming apparatus 101. An item 403 shows a file name of the application and a file name of a license to be installed on the image forming apparatus 101. In FIG. 4, a set of a corresponding application file name and a license file name is presented as the item 403. Further, a plurality of application file names and license file names can be listed as the item 403.

An item 404 shows a file name of an apparatus setting value to be set to the image forming apparatus 101. An item 405 shows a file name of an application setting value corresponding to the application to be installed on the image forming apparatus 101. It is necessary to generate a file for the application setting values for each application and write the application setting values in the file. The setting data management file 401 is generated in advance by the service engineer using a personal computer (PC) or the like and stored in the external storage device 104.

Referring back again to FIG. 3, the progress management unit 308 manages the progress of the setting operation of the software installation of the image forming apparatus 101 and other image forming apparatuses. The setting data management unit 307 updates the firmware, installs the application, and also sets the application setting value and the apparatus setting value. The progress management unit 308 manages the progress status of the processing performed by the setting data management unit 307.

On receiving a notification from the external storage device detection unit 309, the progress management unit 308 obtains the estimated time table 501 stored in the external storage device 104. Then, the progress management unit 308 displays the progress status of the image forming apparatus obtained from the estimated time table 501 on the display 207. Further, the progress management unit 308 estimates the completion time of the setting operation of the image forming apparatus 101 by referencing the estimation reference file 601 stored in the HDD 204 and writes the estimated completion time of the setting operation in the estimated time table 501 stored in the external storage device 104. The estimation method of the estimated time of the present invention is not limited to the method described above so long as the file size and the application time can be considered when the estimated time is calculated. For example, if the estimated time can be estimated from the file size, a method that calculates the time necessary for the installation of the software which can be estimated from the resource amount of the image forming apparatus can be used. According to the first exemplary embodiment, a method that calculates the estimated time using a file called an estimation reference file and a file size is used. The estimation reference file includes the installation time which is necessary for each operation of the setting data.

FIG. 5A illustrates the estimated time table. The estimated time table 501 records the estimated completion time of the setting operation for each operation of the image forming apparatus.

A column 502 shows an apparatus identification (ID) number of the image forming apparatus. The apparatus ID number is identification information necessary for identifying the image forming apparatus. Each image forming apparatus can be uniquely identified by the apparatus ID number. A column 503 shows the estimated installation completion time of firmware. A column 504 shows the estimated installation completion time of an application. A column 505 shows the estimated setting completion time of an apparatus setting value. A column 506 shows the estimated setting completion time of an application setting value. A column 507 shows the start time of the setting operation. The estimated time table 501 does not necessary include the estimated time of all operations. The column of the processes not related to the software installation of the software installation concerned can be blank.

Time corresponding to the columns 503 to 506 is calculated based on the estimation reference file 601 and the size of each piece of data. Information necessary for displaying a screen which the service engineer uses for checking the progress status of the software installation such as the information shown in the estimated time table is referred to as progress information. Since the progress information is stored in the external storage device 104 in association with the identification information, the service engineer can keep track of the progress status of the software installation of each image forming apparatus. The estimated time is not necessary presented in the form of the estimated time table showing the estimated completion time of each operation illustrated in FIG. 5A. For example, in place of the estimated time table, a table presenting the amount of time required for each operation, such as the one illustrated in FIG. 5B, can be used. Since each image forming apparatus displays a screen based on the estimated time table illustrated in FIG. 5A or 5B, the service engineer can check the progress status of the software installation. Again, the information which is necessary for the display of the screen according to the first exemplary embodiment is called progress information.

Figure 6:
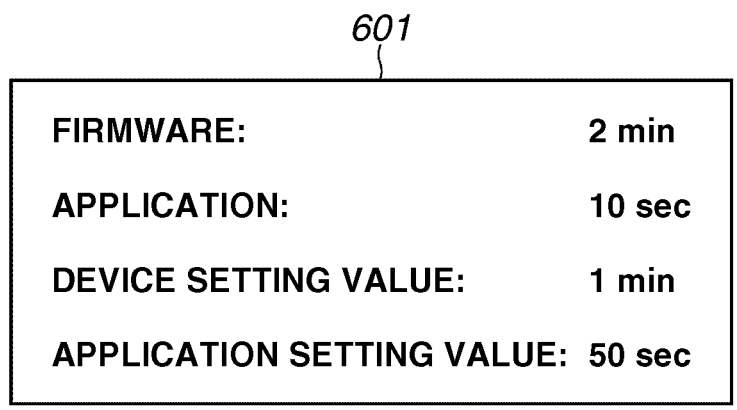
FIG. 6 illustrates an estimation reference file according to the first exemplary embodiment.

FIG. 6 illustrates an estimation reference file. The estimation reference file 601 records the processing time of the setting data for each operation of the setting data. From FIG. 6, it is understood that two minutes is necessary for each operation of the installation processing of firmware. Further, when the setting operation of the image forming apparatus 101 is finished, the progress management unit 308 generates the setting result file 701 described below. The setting result file 701 which is generated is stored in the external storage device 104 via the external storage device I/F 210 when the service engineer who has arrived to collect the software installation result connects the external storage device 104 to a particular image forming apparatus.

FIG. 7 illustrates the setting result file 701. The settings before and after the operation and the amount of time required for the operation are recorded in the setting result file 701 when the setting operation is completed. The service engineer can write a report of the setting operation using the file. From FIG. 7, it can be understood that the firmware has been updated from "Xxx.firm" to "Yyy.firm" and it took ten minutes. The setting result file 701 is generated for each image forming apparatus.

Referring back again to FIG. 3, the external storage device detection unit 309 detects whether the external storage device 104 is connected to the image forming apparatus 101. If the external storage device detection unit 309 detects that the external storage device 104 is connected to the image forming apparatus 101, it notifies the setting data management unit 307 and the progress management unit 308 that the external storage device 104 is connected to the image forming apparatus 101. The application installation unit 310 installs an application on the image forming apparatus 101. Data of the application to be installed is obtained from the setting data management unit 307.

The application setting value management unit 311 manages an application setting value of the application to be installed. The application setting value is obtained from the setting data management unit 307. In FIG. 3, although the application setting value management unit 311 is included in the extension program system service 304, it can be an extension program. The firmware installation unit 312 installs firmware on the image forming apparatus 101. The firmware to be installed is obtained from the setting data management unit 307. The license management unit 313 manages a license file necessary for the installation of the application. The license file is obtained from the setting data management unit 307. The apparatus setting value management unit 314 sets the apparatus setting value to the image forming apparatus 101. The apparatus setting value is obtained from the setting data management unit 307. A communication unit 315 communicates with other image forming apparatuses. For example, the image forming apparatus 101 communicates with the image forming apparatuses 102 and 103 via the communication unit 315.

Figure 8:
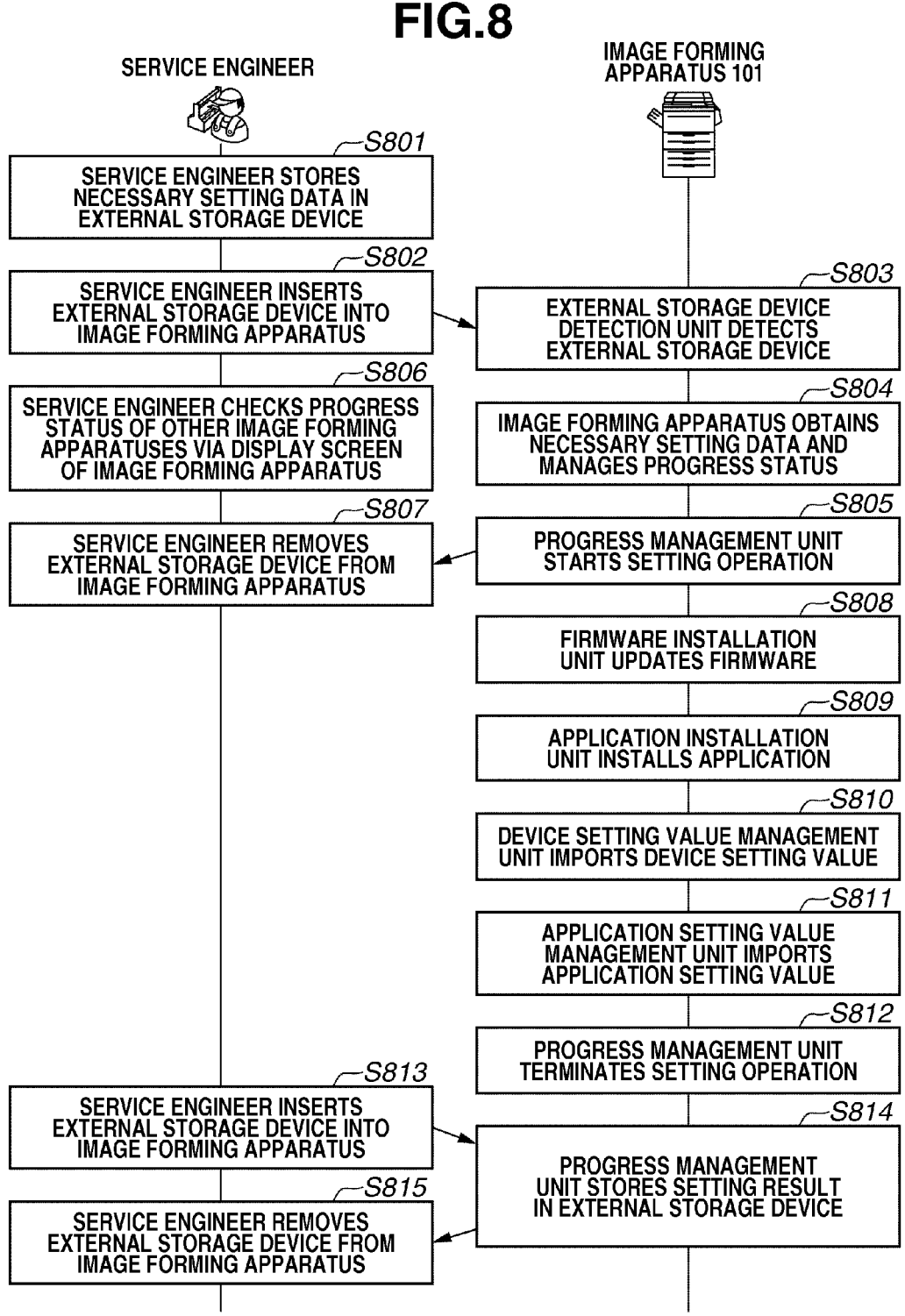
FIG. 8 is a flowchart illustrating an entire operation flow of a setting operation according to the first exemplary embodiment.

FIG. 8 is a flowchart illustrating the flow of the software installation according to the first exemplary embodiment. The flowchart includes the action of the service engineer and the control processing performed by the image forming apparatus 101. The flowchart in FIG. 8 starts with the step in which the service engineer stores necessary setting data in the external storage device 104 and ends when the service engineer stores the setting result of the image forming apparatus 101 in the external storage device 104 and removes the external storage device 104 from the image forming apparatus 101.

In step S801, the service engineer stores the necessary setting data in the external storage device 104. As described above, the setting data can be firmware, an application, a license file, an apparatus setting value, or an application setting value. If the setting data is firmware, an application, or a license file, data stored in a server (not illustrated) can be downloaded to a PC (not illustrated) or the like and written in the external storage device 104.

If the setting data is an apparatus setting value or an application setting value, the value can be generated by a tool on the PC or manually generated on the image forming apparatus. Then, the data of the setting value can be stored in the external storage device 104. The above-described setting data is merely an example and other types of setting data may be required depending on the image forming apparatus. Further, the method for obtaining the setting data is an example and the method is not limited to such a method.

In step S802, the service engineer connects the external storage device 104 with the necessary setting data to the image forming apparatus 101. In step S803, the external storage device detection unit 309 detects the external storage device 104. In step S804, the image forming apparatus 101 obtains the setting data necessary for the image forming apparatus 101 and manages the progress status. Step S804 will be described in detail with reference to FIG. 9.

Figure 9:
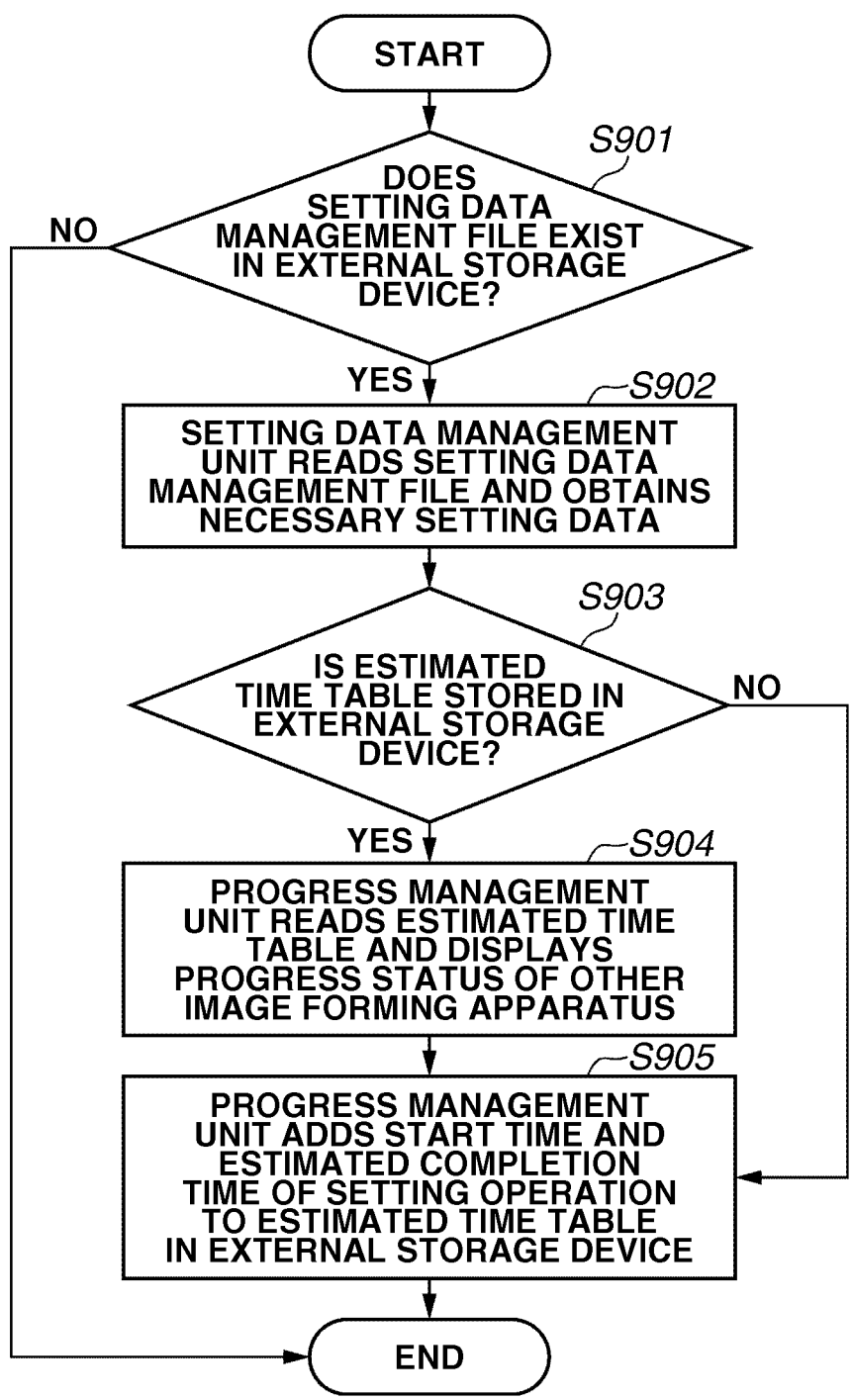
FIG. 9 is a flowchart illustrating a display of a progress status of the setting operation according to the first exemplary embodiment.

FIG. 9 is a flowchart illustrating step S804 in FIG. 8 in detail. The flowchart in FIG. 9 starts with a step in which the setting data management unit 307 determines whether the setting data management file 401 exists in the external storage device 104 and ends with a step in which the progress management unit 308 writes the estimated setting completion time and the start time of the setting operation in the estimated time table 501.

In step S901, the setting data management unit 307 determines whether the setting data management file 401 exists in the external storage device 104. If the setting data management file 401 exists (YES in step S901), the processing proceeds to step S902. If the setting data management file 401 does not exist (NO in step S901), the processing ends.

In step S902, the setting data management unit 307 references the setting data management file 401 and obtains the necessary setting data from the external storage device 104. In step S903, the progress management unit 308 determines whether the estimated time table 501 exists in the external storage device 104. If the estimated time table 501 exists (YES in step S903), the processing proceeds to step S904. If the estimated time table 501 does not exist (NO in step S903), the processing proceeds to step S905.

Figure 12A:
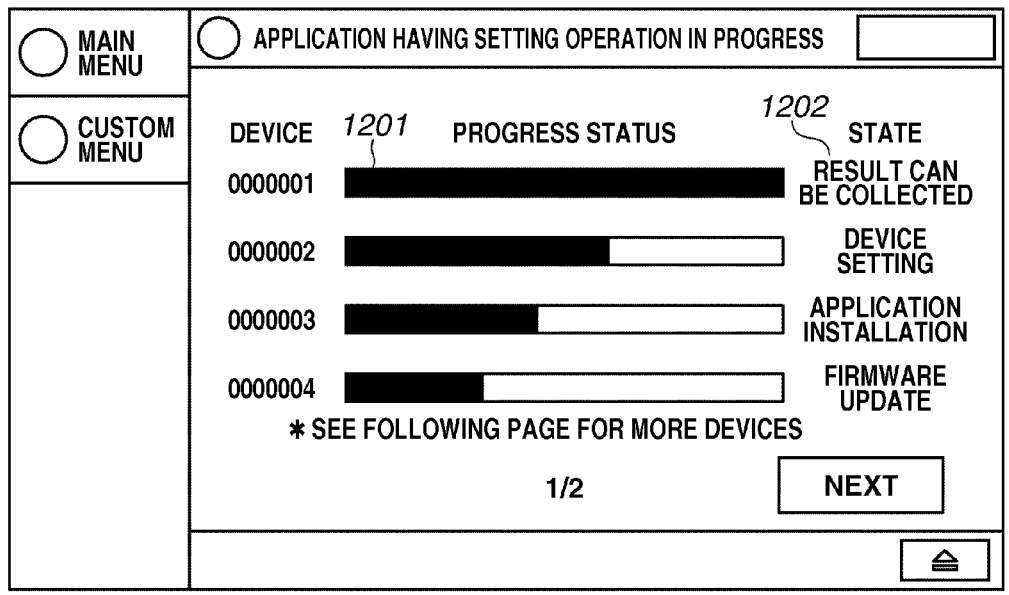
FIGS. 12A and 12B are screens displaying an example of a progress status of the setting operation according to the first exemplary embodiment.

In step S904, the progress management unit 308 references the estimated time table 501 in the external storage device 104 and displays a check screen of the progress status of the software installation on the display 207. An example of the check screen displayed on the display 207 is illustrated in FIG. 12A. Since the software installation of the image forming apparatuses is performed in a parallel manner, the progress status of image forming apparatuses other than the image forming apparatus to which the external storage device is connected will be displayed on the display 207.

In step S905, the progress management unit 308 writes the estimated completion time and the start time of the setting operation of each process of the software installation of the image forming apparatus 101 in the estimated time table 501 stored in the external storage device 104, and stores the progress information and the identification information of the apparatuses in the external storage device 104. Step S905 will be described in detail with reference to FIG. 10.

Figure 10:
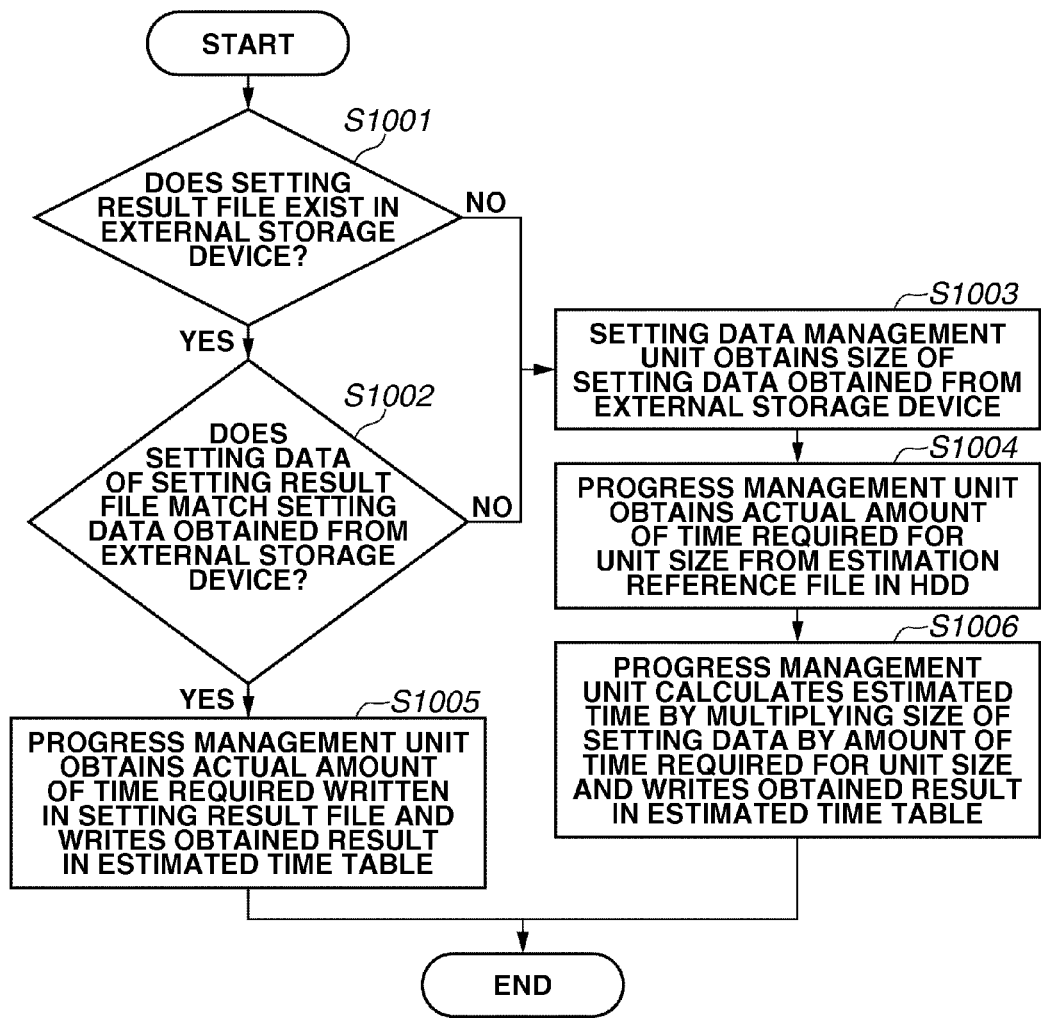
FIG. 10 is a flowchart illustrating calculation of an estimated time of the setting operation according to the first exemplary embodiment.

FIG. 10 is a flowchart illustrating a calculation method of the estimated completion time of the setting operation performed by the progress management unit 308. The flowchart illustrates the processing performed in step S905 in detail. In step S1001, the progress management unit 308 determines whether the setting result file 701 exists in the external storage device 104. If the setting result file 701 exists (YES in step S1001), the processing proceeds to step S1002. If the setting result file 701 does not exist (NO in step S1001), the processing proceeds to step S1003.

In step S1002, the progress management unit 308 compares the setting data in the setting result file 701 with the setting data obtained from the external storage device 104 and determines whether the two pieces of the setting data match. If the two pieces of the data match (YES in step S1002), the processing proceeds to step S1005. If the two pieces of the data do not match (NO in step S1002), the processing proceeds to step S1003. In step S1003, the setting data management unit 307 obtains the size of the setting data obtained from the external storage device 104.

In step S1004, the progress management unit 308 reads the estimation reference file 601 in the HDD 204 and obtains the estimated amount of time which is required for each operation of the setting data. In step S1005, the progress management unit 308 obtains the actual amount of time required, which is written in the setting result file 701, and writes it in the estimated time table 501 as the estimated time.

In step S1006, the progress management unit 308 calculates the estimated time by multiplying the size of the setting data obtained in step S1003 by the estimated amount of time which is required for each operation of the setting data obtained in step S1004, and writes the calculation result in the estimated time table 501. For example, if the estimated amount of time required for installing an application is 5 seconds for 1K bytes and if the size of the application to be installed is 10K bytes, the time necessary for the installation of the application can be estimated as 50 seconds.

Figure 11:
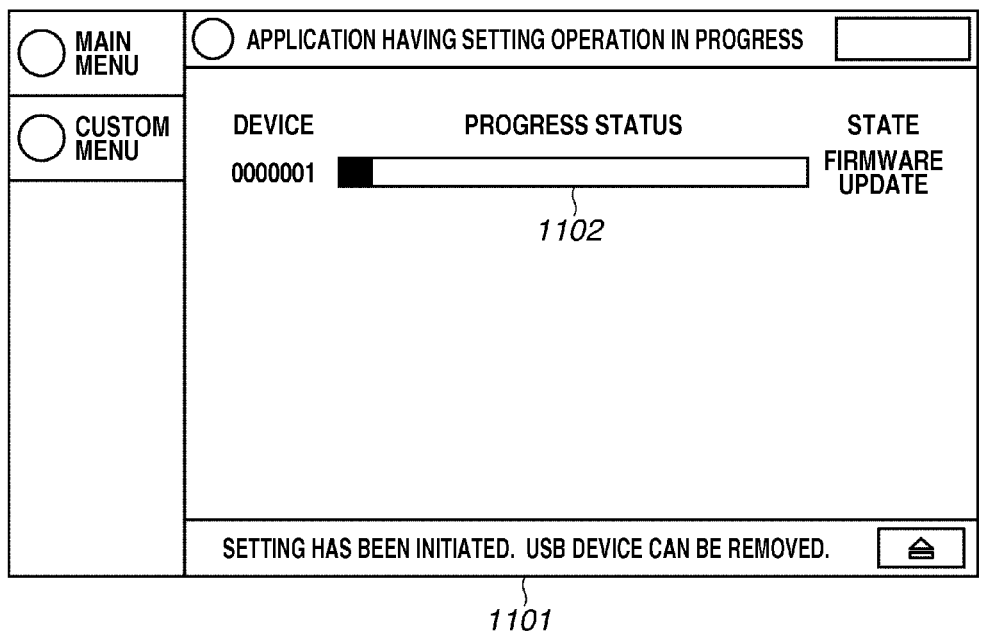
FIG. 11 illustrates a screen when the setting operation is started according to the first exemplary embodiment.

Referring back again to FIG. 8, in step S805, the progress management unit 308 starts the setting operation. When the setting operation of the image forming apparatus 101 is started, a message notifying the service engineer that the external storage device 104 can be removed is displayed on the display 207. FIG. 11 illustrates an example of the display on the display 207 in step S805. A message 1101 indicates that the external storage device 104 can be removed. The content of the message and the display position are not limited to the example illustrated in FIG. 11. A progress status bar 1102 shows an example of the progress status of the setting operation of the image forming apparatus 101. When the setting operation of the image forming apparatus 101 is started, the progress status bar is displayed. Details of the progress display are described below with reference to FIGS. 12A and 12B.

In step S806, the service engineer checks the progress status of each image forming apparatus displayed on the display 207. The progress status of each image forming apparatus to be checked by the service engineer is displayed in step S904 by the image forming apparatus 101 based on the estimated setting completion time of each image forming apparatus written in the estimated time table 501.

FIG. 12A illustrates the check screen of the progress status. A progress status bar 1201 shows the progress status of the setting operation of the software installation. The progress status bar shows the current progress status with respect to the estimated completion time of all operations. Since the current progress status is calculated based on the current time and the estimated setting completion time, the display is updated at real time according to the current time. For example, as illustrated in FIG. 5A, regarding an image forming apparatus identified by an apparatus ID number "0000001", the estimated completion time of all the setting operations is 13:41:46 and the start time is 13:15:46. If the current time is 13:25:31, since 9 minutes 45 seconds has elapsed out of a total time of 26 minutes necessary for the setting, the progress bar indicates 37.5%. When the current time is 13:26:31, the progress status is updated to 41.3%. The update frequency is arbitrary.

An item 1202 shows the current operation. If all the setting operations of an image forming apparatus are completed, a message indicating that the result can be collected is displayed. According to the example described above, if the current time is 13:25:31, since the estimated completion time of the update of the firmware is 13:25:40, it is determined that the firmware is being updated. Thus, a message indicating that the firmware is being updated is displayed. In FIG. 12A, the progress status bar of the image forming apparatus having the apparatus ID of "0000001" presents a state where the progress status is 100% and the result can be collected.

Figure 12B:
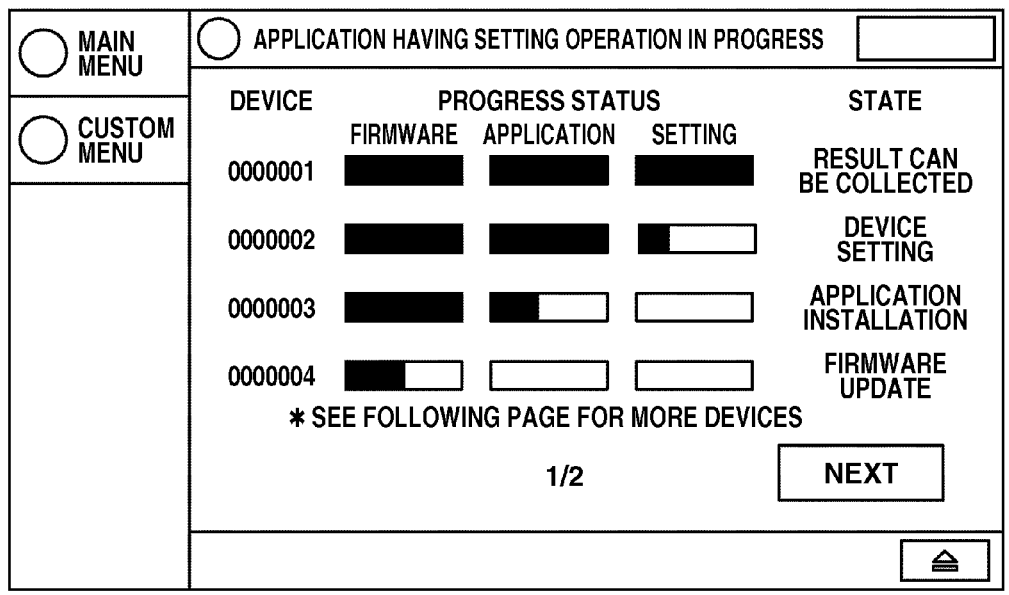

Further, as a display method of the progress status, the current operation of the processes of the necessary setting operations can be displayed as illustrated in FIG. 12B. Further, the state which is displayed is not limited to the operation which is being performed. In other words, finished operations and operations to be performed next can also be displayed. In this manner, the service engineer can check the progress status of each image forming apparatus by viewing the display 207 of the image forming apparatus 101 to which the external storage device 104 is connected.

Referring back again to FIG. 8, in step S807, the service engineer removes the external storage device 104 from the image forming apparatus 101. As described with reference to step S805, since the message indicating that the external storage device 104 can be removed is displayed on the display 207 when the setting of the image forming apparatus 101 is started, the service engineer removes the external storage device 104. Then, the service engineer moves to the image forming apparatuses 102 and 103 and repeats steps S802 to S807.

In step S808, the firmware installation unit 312 updates the firmware. More precisely, the setting data management unit 307 sends the target firmware to the firmware installation unit 312, and the firmware installation unit 312 updates the firmware.

In step S809, the application installation unit 310 installs the application. The setting data management unit 307 sends the application file to the application installation unit 310, and the application installation unit 310 installs the application. Further, the setting data management unit 307 sends a license file corresponding to the application file to the license management unit 313, and the license management unit 313 stores the license file in the HDD 204.

In step S810, the apparatus setting value management unit 314 imports the apparatus setting value. The setting data management unit 307 sends the apparatus setting value to the apparatus setting value management unit 314, and the apparatus setting value management unit 314 imports the received apparatus setting value into the image forming apparatus 101. In step S811, the application setting value management unit 311 imports the application setting value. The setting data management unit 307 sends the application setting value to the application setting value management unit 311, and the application setting value management unit 311 imports the obtained application setting value into the image forming apparatus 101. In step S812, the progress management unit 308 terminates the setting operation. When the setting operation is completed, since the setting result can be collected, a message notifying the service engineer that the setting result can be collected is displayed on the display 207.

Figure 13:
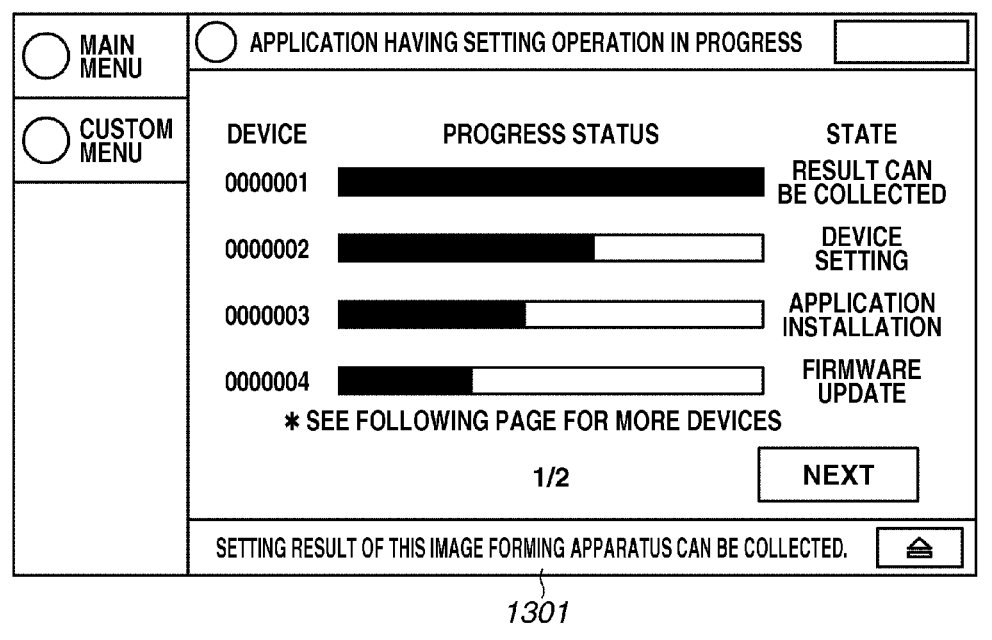

FIG. 13 is an example of a screen which is displayed when the setting operation is completed and the setting result can be collected. A message 1301 indicates that the setting result can be collected. The content of the message and the display position are not limited to the example illustrated in FIG. 13 and an arbitrary message can be displayed at an arbitrary position. The progress status of the setting operation of other image forming apparatuses can be checked even when the setting operation of the image forming apparatus 101 is completed. However, since the service engineer has already removed the external storage device 104 from the image forming apparatus 101 in step S807 and is performing the setting operation of a different image forming apparatus, the screen is displayed only when the service engineer inserts the external storage device 104 into the image forming apparatus 101 again to collect the result. This process is described below with reference to step S813.

In step S813, the service engineer inserts the external storage device 104 into the image forming apparatus 101. More precisely, the service engineer inserts the external storage device 104 again into the image forming apparatus having the setting operation completed so as to collect the setting result. When the service engineer executes the processing in step S813, the service engineer checks the progress status of other image forming apparatuses displayed in step S806 and determines the setting-completed image forming apparatus. Then, the service engineer performs the processing in step S813 for the setting-completed image forming apparatus.

In step S814, the progress management unit 308 stores the setting result file 701 in the external storage device 104. In step S815, the service engineer removes the external storage device 104. In other words, when the collection of the result is completed, the service engineer removes the external storage device 104 from the image forming apparatus 101. Then, the operation ends.

According to the present embodiment, when the service engineer performs the setting operation of the software installation of a plurality of image forming apparatuses using the external storage device 104, the progress status of the software installation of other image forming apparatuses is displayed by a certain image forming apparatus based on the estimated time table. As a result, the service engineer can efficiently collect the setting result of the operation-completed image forming apparatuses. Accordingly, the software installation can be efficiently performed.

According to a second exemplary embodiment, if a network-related setting of a plurality of image forming apparatuses (the image forming apparatuses 101, 102, and 103) is finished in advance, each of the image forming apparatuses 101, 102, and 103 can mutually check the progress status of the software installation of other image forming apparatuses via the LAN 202. More precisely, if an image forming apparatus is identified by the identification information stored in the external storage device, the progress status of other image forming apparatuses can be checked by the image forming apparatus via the network.

Figure 14:
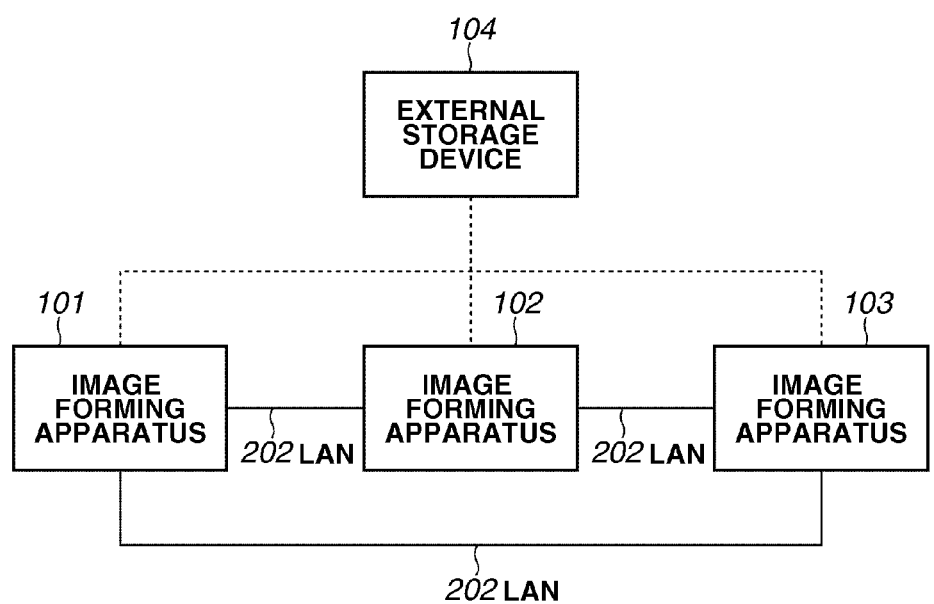
FIG. 14 illustrates a configuration of a system according to a second exemplary embodiment of the present invention.

The system configuration according to the second exemplary embodiment will be described with reference to FIG. 14. According to the second exemplary embodiment, each of the image forming apparatuses 101, 102, and 103 is connected to one another by the LAN 202. Since other configurations are similar to those described according to the first exemplary embodiment, their description is not repeated.

Figure 15:
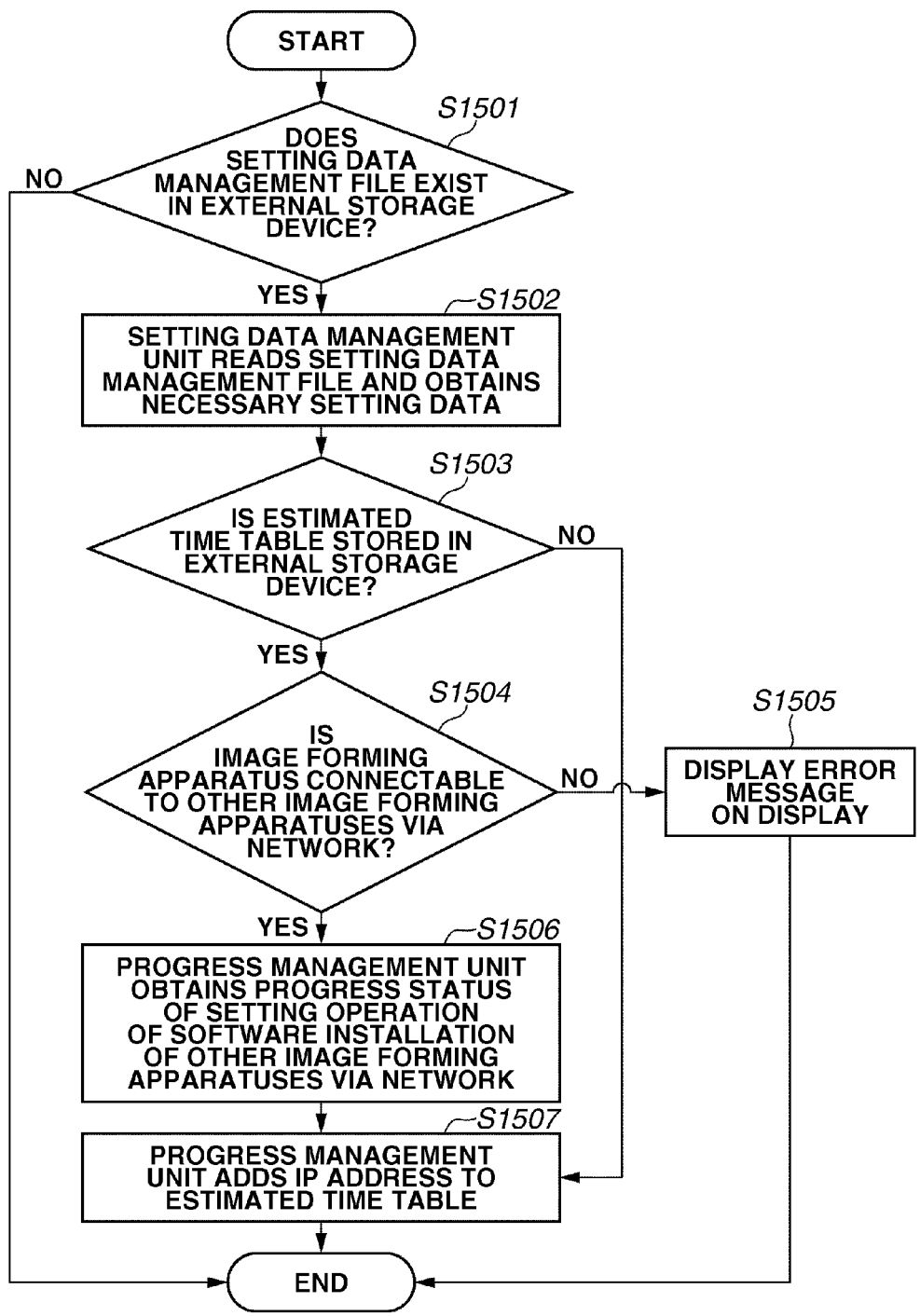
FIG. 15 is a flowchart illustrating a display of a progress status of the setting operation according to the second exemplary embodiment.

Since the entire operation flow is similar to that described with reference to the flowchart in FIG. 8 according to the first exemplary embodiment excluding step S804, the description of the operation flow is not repeated. The processing in step S804 will be described in detail with reference to FIG. 15.

Since steps S1501 and S1502 are similar to steps S901 and S902 in FIG. 9, their description is not repeated. In step S1503, the progress management unit 308 determines whether an estimated time table 1701 exists in the external storage device 104. If the estimated time table 1701 exists (YES in step S1503), the processing proceeds to step S1504. If the estimated time table 1701 does not exist (NO in step S1503), the processing proceeds to step S1507.

In step S1504, the communication unit 315 determines whether the image forming apparatus 101 can communicate with the image forming apparatuses 102 and 103 via the LAN 202. Whether the image forming apparatus 101 can communicate with other image forming apparatuses can be determined by using, for example, ping. At that time, the IP address in the estimated time table 1701 is referenced as the destination. If the image forming apparatus 101 can communicate with other image forming apparatuses (YES in step S1504), the processing proceeds to step S1506. If the image forming apparatus 101 cannot communicate with other image forming apparatuses (NO in step S1504), the processing proceeds to step S1505.

Figure 16:
FIG. 16 is a screen displaying an error message according to the second exemplary embodiment.

In step S1505, since the progress management unit 308 cannot communicate with the image forming apparatuses 102 and 103 via the LAN 202, the image forming apparatus displays an error message on the display 207. FIG. 16 illustrates a screen displaying the error message. The screen in FIG. 16 is an example of the display which is displayed in step S1505 when the progress information cannot be obtained via the network. From FIG. 16, it is understood that an error has occurred in association with the network connection with an image forming apparatus identified by an ID number "0000002", and the progress status cannot be obtained via the network. The content of the message and the display position are not limited to the example illustrated in FIG. 16.

In step S1506, the progress management unit 308 obtains the progress status of the setting operation of the software installation of the image forming apparatuses 102 and 103 via the LAN 202. In step S1507, the progress management unit 308 adds the IP address of the image forming apparatus 101 to the estimated time table 1701. This is because when the external storage device 104 is inserted into the image forming apparatuses 102 and 103, the image forming apparatuses 102 and 103 can reference the IP address for communication with the image forming apparatus 101.

FIG. 17 illustrates an example of the estimated time table according to the present embodiment. The difference from the estimated time table according to the first exemplary embodiment is that only the apparatus ID number and the IP address of the image forming apparatus are included in the table. Further, according to the present embodiment, when the service engineer collects the setting result in step S813, the service engineer can collect the setting results of other image forming apparatuses in a collective manner via the network.

According to the present embodiment, when a service engineer performs the installation operation of the image forming apparatuses which can communicate via the network by using the external storage device 104, the service engineer can check the progress status of other image forming apparatuses via the network on a certain image forming apparatus. Further, the progress status of the software installation of other image forming apparatuses can be displayed on a certain image forming apparatus. Accordingly, the service engineer can efficiently collect the setting result of the setting-completed image forming apparatuses.

Figure 18:
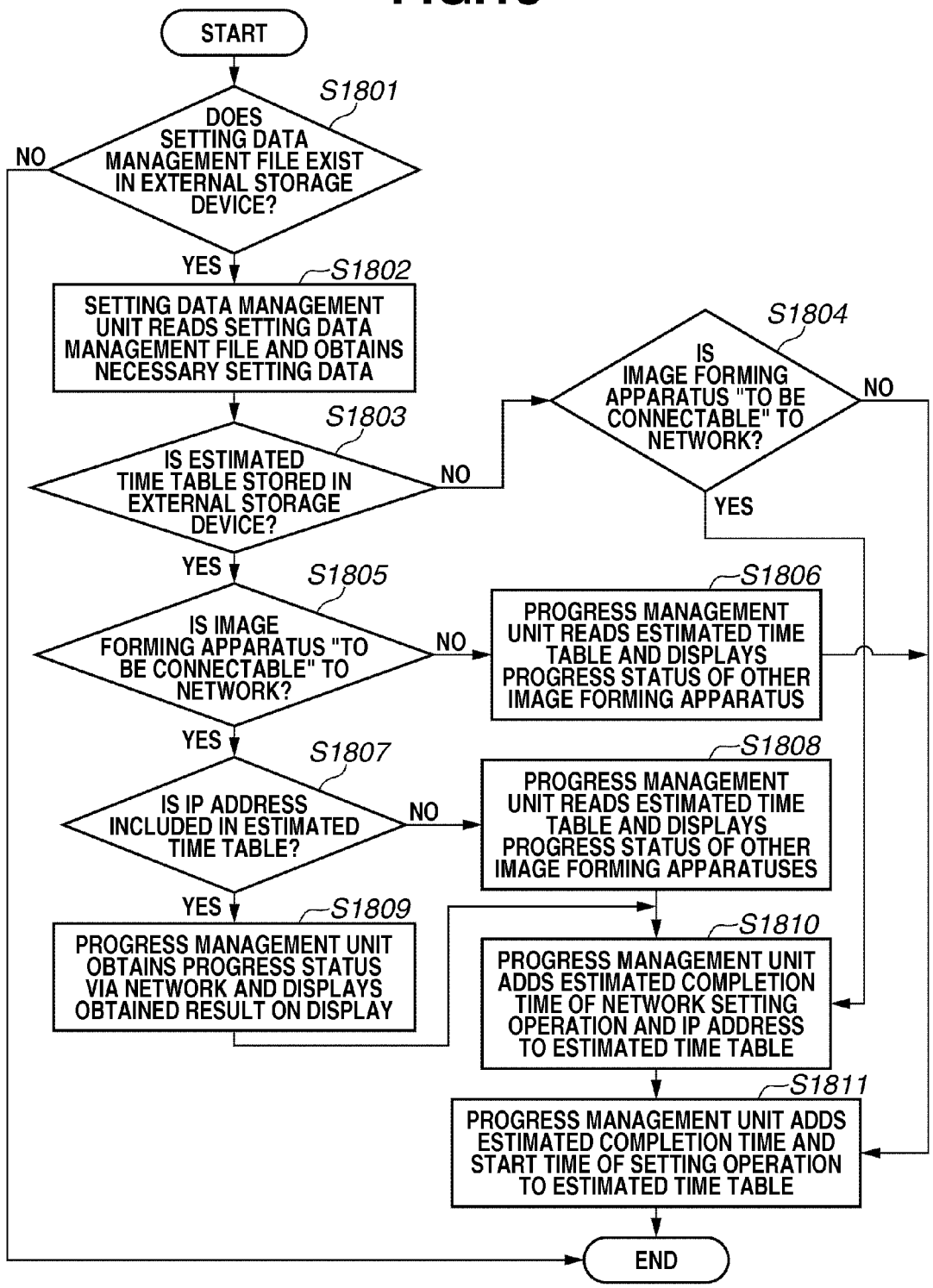
FIG. 18 is a flowchart illustrating a display of a progress status of the setting operation according to a third exemplary embodiment.

According to a third exemplary embodiment, the image forming apparatuses 101, 102, and 103 can be connected to one another via the LAN. The difference from the second exemplary embodiment is that the network setting is not completed in advance. In other words, the image forming apparatuses can be connected to the network after the network setting, which is stored in the external storage device 104 as an apparatus setting value, is set to the image forming apparatuses. In the following description, even if the network setting is not completed in advance, if an image forming apparatus can be connected to the network when the apparatus setting value is set, the state of the apparatus is expressed as "to be network connectable". Since the entire operation flow is similar to that described with reference to the flowchart in FIG. 8 excluding step S804, the description of the operation flow is not repeated. The processing in step S804 will be described in detail with reference to FIG. 18 as it is different from step S804 according to the first and the second exemplary embodiments.

Since steps S1801 and S1802 are similar to steps S901 and S902 in FIG. 9, their description is not repeated. In step S1803, the progress management unit 308 determines whether an estimated time table 1901 exists in the external storage device 104. If the estimated time table 1901 exists (YES in step S1803), the processing proceeds to step S1805. If the estimated time table 1901 does not exist (NO in step S1803), the processing proceeds to step S1804.

FIG. 19 illustrates an example of the estimated time table 1901 according to the third exemplary embodiment. The difference from the estimated time table according to the first exemplary embodiment is that the estimated completion time of the network setting and the IP address are added to the table. As is described according to the first exemplary embodiment, the format of the estimated time table is not limited to the format illustrated in FIG. 19.

In step S1804, the setting data management unit 307 determines whether the image forming apparatus is to be network connectable. Whether the image forming apparatus is to be network connectable is determined according to whether the network setting is included in the apparatus setting value. The network setting is the setting necessary for the network connection such as the IP address or proxy setting. The setting data management unit 307 extracts the network setting from the apparatus setting value. If the setting data management unit 307 succeeds in extracting the network setting, it is determined that the image forming apparatus 101 is to be network connectable. If the image forming apparatus 101 is to be network connectable (YES in step S1804), the processing proceeds to step S1810. If the image forming apparatus 101 is not to be network connectable (NO in step S1804), the processing proceeds to step S1811.

In step S1805, the setting data management unit 307 determines whether the image forming apparatus is to be network connectable. The determination method is similar to the method described in step S1804. If the image forming apparatus 101 is to be network connectable (YES in step S1805), the processing proceeds to step S1807. If the image forming apparatus 101 is not to be network connectable (NO in step S1805), the processing proceeds to step S1806. In step S1806, the progress management unit 308 reads the estimated time table 1901 and displays the progress status of other image forming apparatuses on the display 207.

In step S1807, the progress management unit 308 determines whether the IP address is included in the estimated time table 1901. If the IP address is not included (NO in step S1807), the processing proceeds to S1808. If the IP address is included (YES in step S1807), the processing proceeds to step S1809. In step S1808, the progress management unit 308 reads the estimated time table 1901 and displays the progress status of other image forming apparatuses on the display 207.

In step S1809, the progress management unit 308 obtains the progress status of the setting operation of the image forming apparatuses 102 and 103 via the LAN 202 and displays the obtained result on the display 207. If the progress management unit 308 fails to obtain the progress information via the LAN 202 due to some network error, the progress management unit 308 determines not to obtain the progress information via the LAN 202 and calculates the progress status based on the estimated time table 1901 in the external storage device 104. Details of the processing in step S1809 will be described with reference to FIG. 20.

Figure 20:
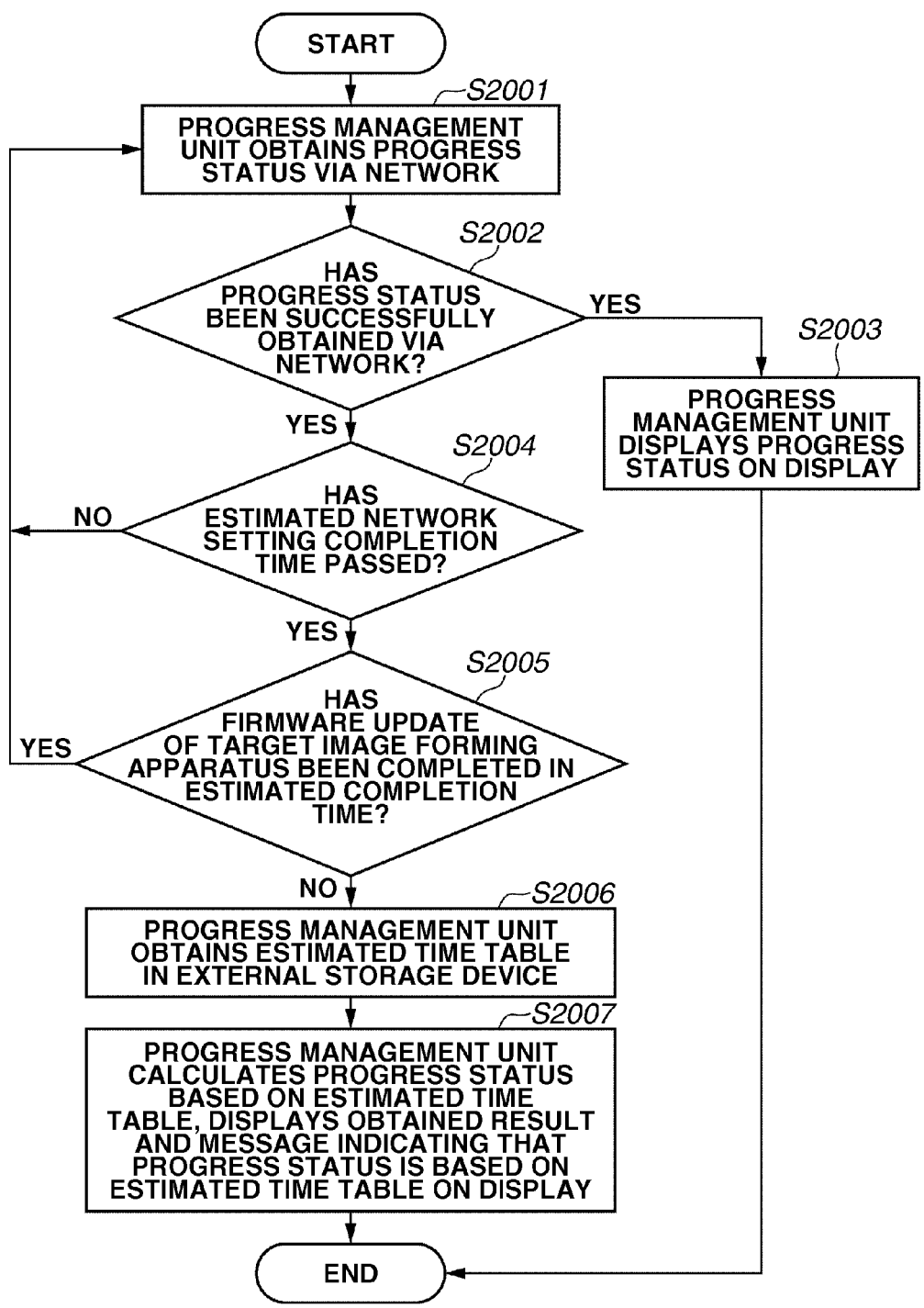
FIG. 20 is a flowchart illustrating acquisition of a progress status of the setting operation via a network according to the third exemplary embodiment.

FIG. 20 is a flowchart illustrating the operation flow when the acquisition of the progress status via the LAN 202 has been failed in step S1809. In step S2001, the progress management unit 308 obtains the progress status via the communication unit 315. In step S2002, the progress management unit 308 determines whether the progress status has been successfully obtained. If the progress status has not yet been obtained (NO in step S2002), the processing proceeds to step S2004. If the progress status has been obtained (YES in step S2002), the processing proceeds to step S2003.

In step S2003, the progress management unit 308 displays the progress status obtained via the LAN 202 on the display 207. In step S2004, the progress management unit 308 determines whether the network setting of the target image forming apparatus has been completed by obtaining the estimated network setting completion time of the target image forming apparatus from the estimated time table 1901 in the external storage device 104 and comparing the time with the current time. If the progress management unit 308 determines that the network setting has been completed (YES in step S2004), the processing proceeds to step S2005. If the progress management unit 308 determines that the network setting has not yet been completed (NO in step S2004), the processing returns to step S2001.

In step S2005, the progress management unit 308 determines whether the firmware of the target image forming apparatus is being updated. In other words, the progress management unit 308 obtains the estimated completion time of the firmware update of the target image forming apparatus from the estimated time table 1901 in the external storage device 104. Then, by comparing the obtained estimated completion time and the current time, the progress management unit 308 determines whether the firmware update of the target image forming apparatus has been completed. Since the network communication is not possible while the firmware is being updated, if the progress management unit 308 fails to obtain the progress status via the network, the progress management unit 308 tries again. If the progress management unit 308 determines that the firmware update has been completed (NO in step S2005), the processing proceeds to step S2006. If the progress management unit 308 determines that the firmware is being updated (YES in step S2005), the processing returns to step S2001. The firmware update may be firmware installation.

In step S2006, the progress management unit 308 checks the estimated time table 1901 in the external storage device 104. In step S2007, the progress management unit 308 displays the progress status on the display 207 based on the estimated time table 1901.

Figure 21:
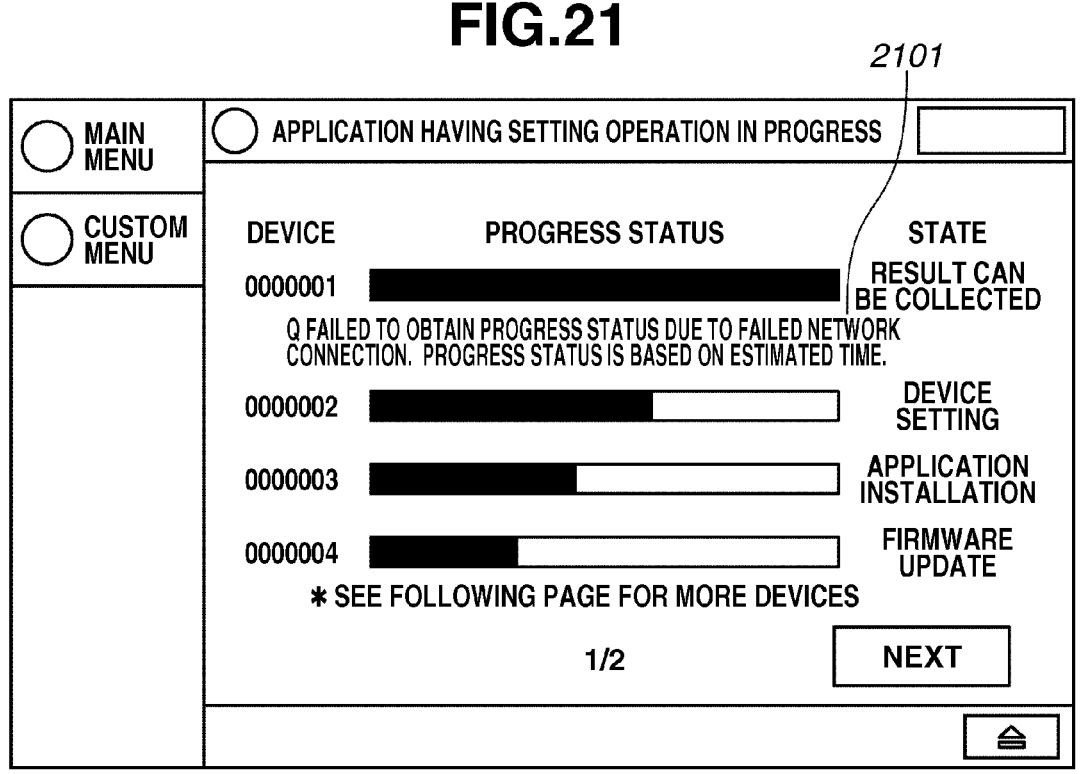
FIG. 21 illustrates a screen which is displayed when the acquisition of a progress status of the setting operation via the network has failed according to the third exemplary embodiment.

FIG. 21 illustrates an example of a screen which displays the progress status in step S2007. A message 2101 indicates that the acquisition of the progress status via the network has been failed and the estimated value is based on the estimated time table 1901 in the external storage device 104. The progress status based on the estimated value is an estimated progress status. Under the network environment, the progress status which is more accurate can be obtained via the network. By displaying the message 2101, it is notified to the service engineer that the estimated value of the progress of the software installation is used as the second best way. The content of the message and the display position are not limited to the example illustrated in FIG. 21.

In step S1810, the progress management unit 308 writes the estimated completion time of the network setting operation and the IP address of the image forming apparatus 101 in the estimated time table 1901. In step S1811, the progress management unit 308 writes the estimated completion time and the start time of the setting operation in the estimated time table 1901.

According to the present embodiment, when an installation operation of a plurality of image forming apparatuses which can communicate on the network is performed by using the external storage device 104, the progress status of other image forming apparatuses can be obtained via the network and displayed on the image forming apparatus. Further, a check unit which checks the progress status of other image forming apparatuses by displaying a progress status based on estimation even if the network cannot be used is provided. As a result, the service engineer can efficiently collect the setting result from of operation-completed image forming apparatuses.

According to the exemplary embodiments of the present invention, software installation of an image forming apparatus is described as an example. However, the application of the present invention is not limited to an image forming apparatus. For example, the present invention can be applied to an information processing apparatus such as a PC.

The above-described exemplary embodiments can also be achieved by supplying a software program that realizes each function of the aforementioned exemplary embodiments to a system or an apparatus via a network or various types of storage media, and a computer (or a CPU or a micro processing unit (MPU)) in the system or the apparatus reads and executes the program stored in such storage media.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-013323 filed Jan. 28, 2013, which is hereby incorporated by reference herein in its entirety.

What is claimed is:

1. An apparatus having a processor and to which an external storage device is connectable, the apparatus comprising:

a setting unit configured to, after the external storage device is connected, perform software installation of the apparatus based on setting data acquired from the external storage device;

a storage control unit configured to store, in the external storage device, progress information necessary for displaying a screen used for checking a progress status of the software installation and identification information of the apparatus;

a display unit configured to display the progress status of the software installation of the apparatus identified by the identification information stored in the external storage device, based on the progress information; and a check unit configured to check the progress status of the software installation of the apparatus identified by the identification information stored in the external storage device with respect to the apparatus via a network, wherein the display unit displays the progress status of the software installation of the apparatus checked by the check unit, and wherein, if the check unit is unable to check the progress status of the software installation of the apparatus identified by the identification information stored in the external storage device with respect to the apparatus via the network, the display unit displays the progress status of the software installation of the apparatus based on the progress information of the apparatus stored in the external storage device.

2. The apparatus according to claim 1, wherein the display unit displays a screen that allows checking of a current process and a finished process of the software installation performed by the apparatus identified by the identification information relative to each process of the software installation.

3. The apparatus according to claim 1, wherein, if a plurality of pieces of identification information is stored in the external storage device, the display unit displays the progress status of the software installation of a plurality of apparatuses identified by each piece of identification information based on each piece of progress information stored in association with each piece of identification information.

4. The apparatus according to claim 1, wherein the progress information stored in the external storage device is an estimated time of the progress status of the software installation being executed by the apparatus, and
wherein the display unit displays a screen that allows checking of the progress status of the software installation according to information of the estimated time stored in the connected external storage device and a current time.

5. The apparatus according to claim 1, wherein, when the check unit is unable to check the progress status of the software installation of the apparatus via the network, if the display unit displays the progress status of the software installation of the apparatus based on the progress information of the apparatus stored in the external storage device, the display unit further displays a message indicating a network error and a message indicating that an estimate of the progress of the software installation is being displayed.

6. The apparatus according to claim 1, wherein the software installation includes installing software obtained from the external storage device on the apparatus and reflecting a setting value acquired from the external storage device as a setting value of the installed software.

7. A method for controlling an apparatus to which an external storage device is connectable, the method comprising:

performing, after the external storage device is connected, software installation of the apparatus based on setting data acquired from the external storage device;

storing progress information necessary for displaying a screen used for checking a progress status of the software installation and identification information of the apparatus in the external storage device;

displaying the progress status of the software installation of the apparatus identified by the identification information stored in the external storage device, based on the progress information; and checking the progress status of the software installation of the apparatus identified by the identification information stored in the external storage device with respect to the apparatus via a network, and displaying the checked progress status of the software installation of the apparatus, but if the progress status of the software installation of the apparatus identified by the identification information stored in the external storage device cannot be checked with respect to the apparatus via the network, displaying the progress status of the software installation of the apparatus based on the progress information of the apparatus stored in the external storage device.

8. The method according to claim 7, further comprising displaying a screen that allows checking of a current process and a finished process of the software installation performed by the apparatus identified by the identification information relative to each process of the software installation.

9. The method according to claim 7, further comprising, if a plurality of pieces of identification information is stored in the external storage device, displaying the progress status of the software installation of a plurality of apparatuses identified by each piece of identification information based on each piece of progress information stored in association with each piece of identification information.

10. The method according to claim 7, wherein the progress information stored in the external storage device is an estimated time of the progress status of the software installation being executed by the apparatus, and
wherein the method further comprises displaying a screen that allows checking of the progress status of the software installation according to information of the estimated time stored in the connected external storage device and a current time.

11. The method according to claim 7, further comprising, when the progress status of the software installation of the apparatus cannot be checked via the network, if the progress status of the software installation of the apparatus based on the progress information of the apparatus stored in the external storage device is to be displayed, further displaying a message indicating a network error and a message indicating that an estimate of the progress of the software installation is being displayed.

12. The method according to claim 7, wherein the software installation includes installing software obtained from the external storage device on the apparatus and reflecting a setting value acquired from the external storage device as a setting value of the installed software.

13. A non-transitory storage medium storing a program that causes a computer to execute the method according to claim 7.

* * * * *